April 25, 1950 F. P. MASON 2,504,997

RECEIVER FOR START-STOP PRINTING TELEGRAPH SIGNALS

Filed May 20, 1947 4 Sheets-Sheet 1

Inventor
Frederick Percival Mason
By E. D. Phinney
Attorney

April 25, 1950 F. P. MASON 2,504,997

RECEIVER FOR START-STOP PRINTING TELEGRAPH SIGNALS

Filed May 20, 1947 4 Sheets-Sheet 2

Inventor
Frederick Percival Mason
By E. D. Phinney
Attorney

April 25, 1950 F. P. MASON 2,504,997

RECEIVER FOR START-STOP PRINTING TELEGRAPH SIGNALS

Filed May 20, 1947 4 Sheets-Sheet 3

Inventor
Frederick Percival Mason
By E. D. Phinney
Attorney

April 25, 1950 F. P. MASON 2,504,997

RECEIVER FOR START-STOP PRINTING TELEGRAPH SIGNALS

Filed May 20, 1947 4 Sheets-Sheet 4

Inventor
Frederick Percival Mason
By E. D. Phinney
Attorney

Patented Apr. 25, 1950 2,504,997

UNITED STATES PATENT OFFICE 2,504,997

RECEIVER FOR START-STOP PRINTING TELEGRAPH SIGNALS

Frederick Percival Mason, Croydon, England, assignor to Creed and Company Limited, Croydon, England, a British company Application May 20, 1947, Serial No. 749,240
In Great Britain July 26, 1940

Section 1, Public Law 690, August 8, 1946
Patent expires July 26, 1960

2 Claims. (Cl. 178—17.5)

This invention relates to means for receiving and distributing start-stop telegraph signals.

According to the present invention start-stop telegraph signals are received and distributed by means of a continuously rotating distributor incorporating storage means for the incoming signals. The device is arranged so that an incoming impulse is supplied to and stored by any group of segments (or their equivalents) of the distributor that is passing a particular point during the reception of such impulse. The start impulse thus received and stored initiates the simultaneous transfer of all the character impulses to a translating device and this takes place as the portion of the distributor upon which the start impulse is stored, passes a further point sufficiently distant from the receiving point for all the character impulses to have been received and stored.

Figure 1:
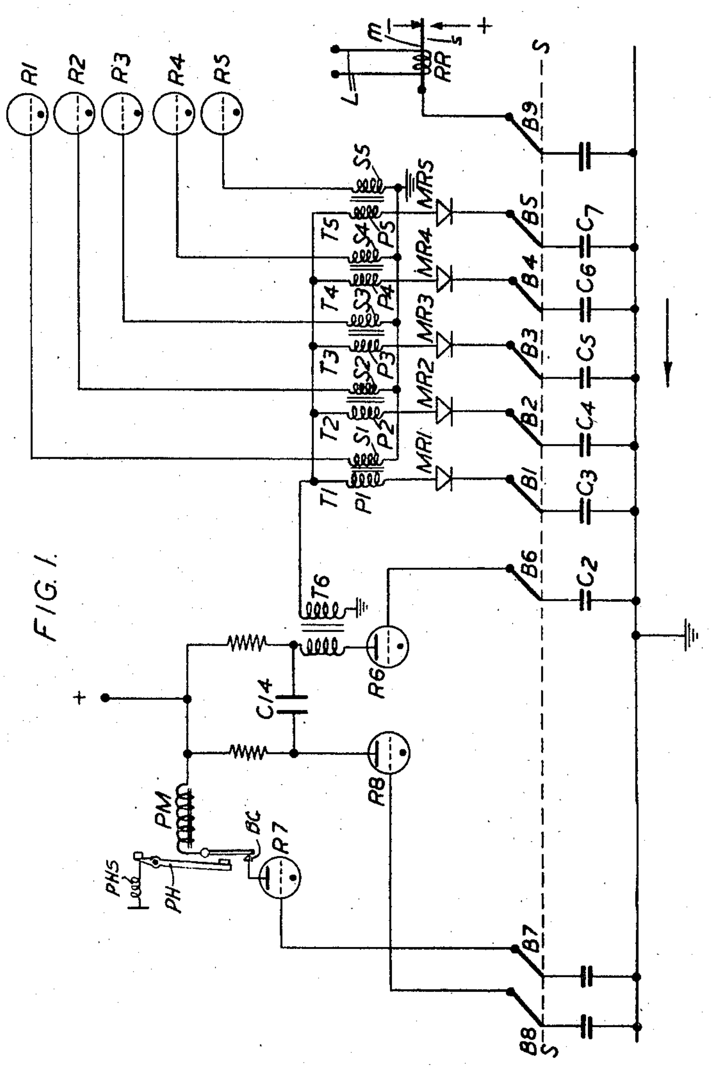
Figure 4:
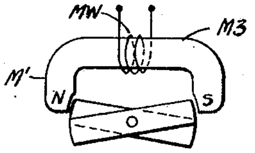
Figure 5:
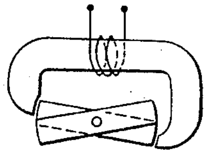
Figure 6:
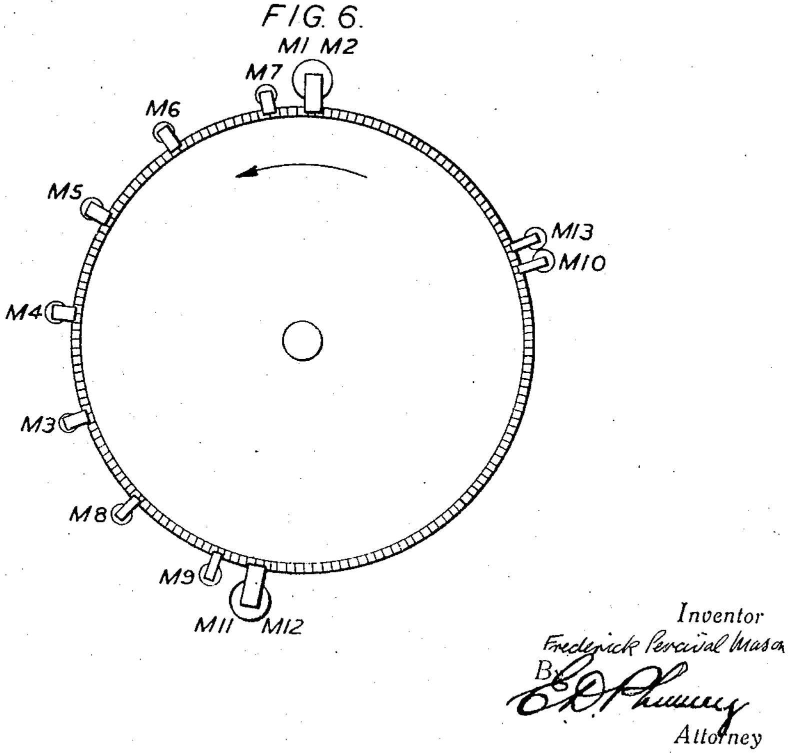
Figure 7:
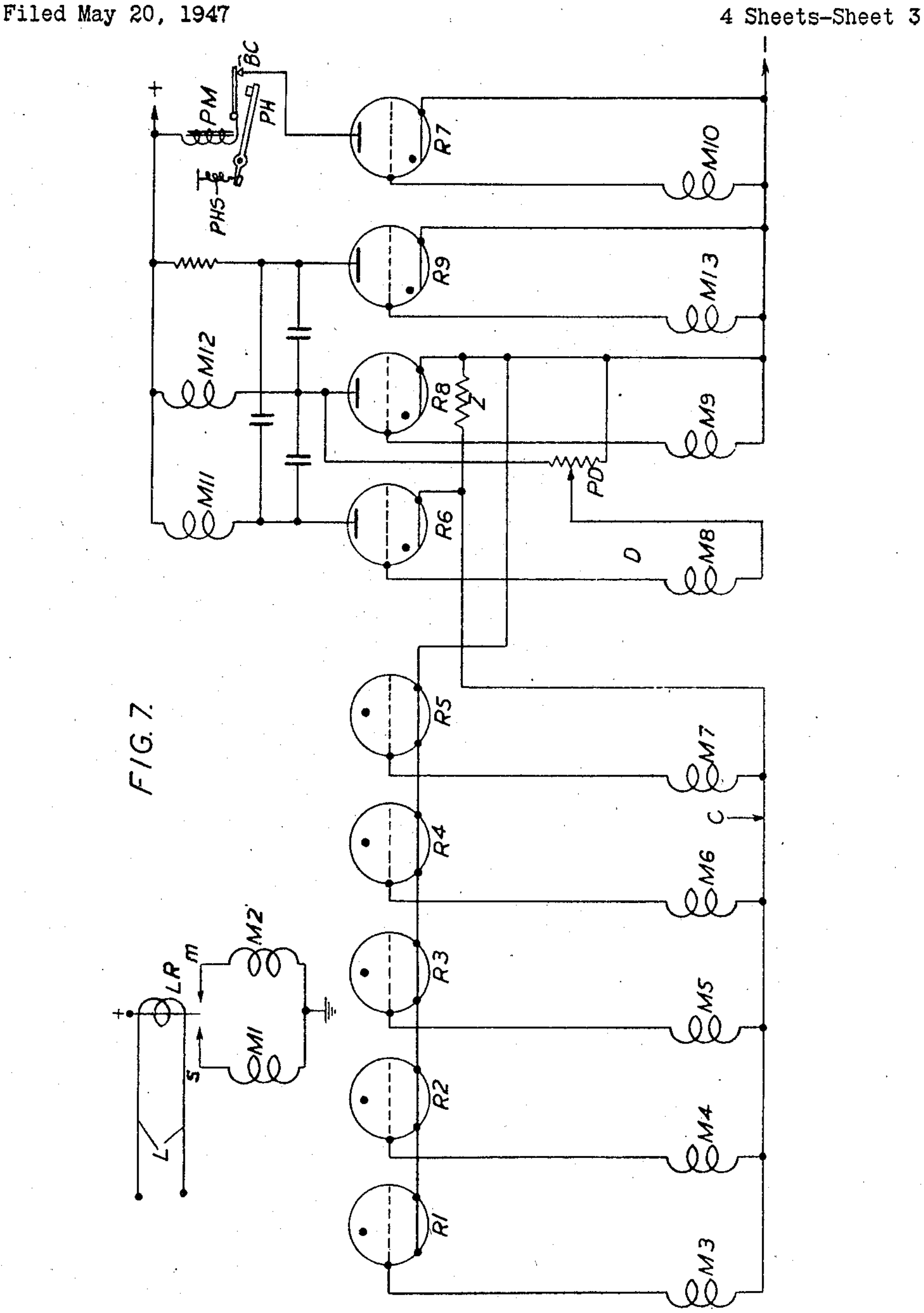
Figure 8:
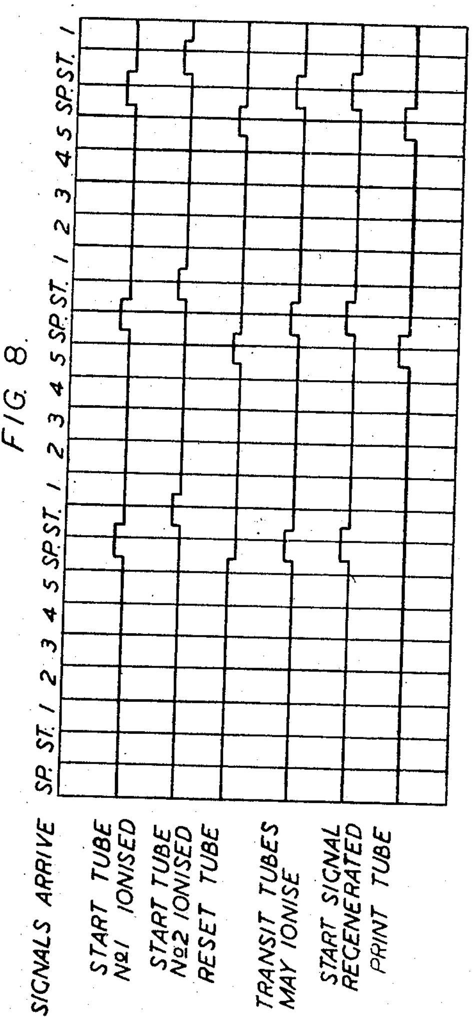

The nature of the invention will be better understood from the following description of two different embodiments thereof taken in conjunction with the accompanying drawings, in which Fig. 1 shows schematically a device using a brush-type distributor, whilst Figs. 2–7 illustrate a device using a magnetic form of distributor, and Fig. 8 is a diagram of the sequence of operations of this device. Figs. 2–5 show the form of magnetic pole pieces forming part of the distributor and of the magnets with which they cooperate. Fig. 6 is a front view of the distributor, and Fig. 7 a circuit diagram of the connections.

Referring now to Fig. 1, the rotating distributor comprises a drum having a plurality of segments and containing condensers, some of which are shown at $C_2$ . . . $C_7$. One side of each condenser is connected to a corresponding segment and the other side is connected to earth. The segments co-operate with a plurality of brushes B1 . . . B9. Either the drum or the brushes may rotate, as will be readily understood, but in the following description it will be assumed that the drum rotates in the direction of the arrow. The drum rotates continuously at constant speed. This speed need only be roughly synchronous with that of the transmitter and the drum has at least as much speed tolerance as the motor of a normal start-stop printing telegraph receiver.

One brush B9, is connected to the armature of the line relay RR, the marking contact *m* of which is connected to ground, and the spacing contact *s* to spacing potential. So long as no signals are being received, the condensers passing beneath the brush B9 remain uncharged, but as soon as the armature of the relay RR moves to its spacing contact *s* in response to a start signal, the condenser connected to the next segment to pass the brush B9 becomes charged. During the continuance of the start signal any condenser connected to a segment passing beneath the brush B9 will also be charged and similarly successive groups of condensers will be charged or left uncharged in accordance with the position of the armature of relay RR in response to the character impulses.

Assume $C_2$ to be the first of the group of condensers to be charged by the start signal, when this condenser reaches brush B6 which is situated approximately 180° from brush B1, the potential thereon will be impressed on the grid of a three-electrode gas filled discharge tube R6 and will cause that tube to ionise. The initiation of anode current in the primary of the transformer T6 connected to the anode of tube R6 will cause an impulse of current in the secondary of this transformer. This secondary is connected through the primaries of transformers T1 . . . T5 in parallel, each of which is connected through a rectifier MR1 . . . MR5 to a brush B1 . . . B5 of the distributor. When the segment to which condenser $C_2$ is connected has reached brush B6, brushes B1 . . . B5 will lie on segments connected to condensers $C_3$ . . . $C_7$ each of which is amongst the group of condensers charged or not charged respectively according to a character impulse.

The potential of those condensers that are charged will oppose the potential due to the impulse in the secondary of transformer T6 but in the case of any of the brushes B1 . . . B5 meeting a segment connected to an uncharged condenser, the condenser will be charged and the charging current will induce an impulse in the secondary of one of the transformers T1 . . . T5 and so increase the potential of the grid of a three-electrode gas discharge tube R1 . . . R5 as to initiate a discharge therein. In tubes R1 . . . R5 only the grid electrodes are shown and the anode circuits of said tubes are connected so as to actuate a translator of the received signals in known manner.

When the condenser $C_2$ arrives at brush B7, a three-electrode gas filled tube R7 is triggered off and a magnet PM in the anode circuit thereof energised to actuate a printing hammer PH against the tension of spring PHS. Condenser $C_2$ arrives at brush B8 when the group of condensers corresponding to the stop signal is under brush B6. Three-electrode gas filled tube R8 is thus ionised, and, due to the connection of condenser $C_{14}$ between the anodes of tubes R6 and R8, tube R6 is de-ionised; since the stop signal group of condensers is at this moment under brush B6, and since these condensers are uncharged, tube R6 does not re-ionise until the next start signal arrives at brush B6.

It will be appreciated that the margin of selection allowed for each impulse depends upon the number of condensers passing a brush during the receipt of each character. As the brush B6 is approximately 180° from brush B9, a suitable speed for the drum is one revolution in two characters i. e. about 230 R. P. M. for 50 bauds. It may be shown that to provide approximately 90% margin for each impulse, ten condensers are required for each signal element i. e. 140 condensers for the drum. To obtain 95% margin double this number is required.

It will also be seen that the exact speed of the drum is immaterial within normal start-stop limits as the start signal is stored in the particular part of the drum under the brush B9 and this may be in a fresh position for each character.

In the modification of Figs. 2–8 it is proposed to utilise approximately 200 soft iron armatures A, situated round a drum DR, which is rotated by a motor (not shown), which armatures can be conditioned to a marking or spacing position by a stationary electro-magnet as they pass by. These armatures then influence, as they pass by, reading or transit electro-magnets stationarily situated round the drum; the stationary magnets and the rotating armatures form a generator, and impulses produced in the magnet windings condition five gas-filled code or transit tubes R1—R5 according to the code combination. There are thus no moving parts in contact with one another and no wear of any kind is possible. Also, as there is negligible resistance to the rotation of the drum, apart from its bearing friction, a very small motor may be used to drive the drum, the actual wattage output necessary being about 2 or 3 watts. The whole assembly of armature reading and setting magnets may be screwed on the end of the motor, while the drum rotates within them.

Figure 2:
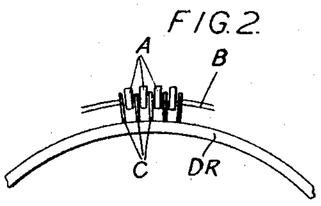
Figure 3:
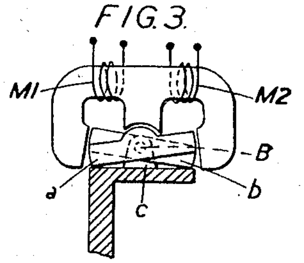

Referring to Figs. 2 and 3, the armatures A are mounted on a continuous wire ring B concentric with a drum DR, carried by the motor shaft (not shown) and supported on thin projections C; these projections separate the armatures, and so serve to prevent the movement of one armature interfering with the setting of the adjacent armatures. The armatures may be in either position *a* or position *b* (according to which of the two armatures setting magnets M1 or M2 was energised when the armatures passed this point), and are maintained in this condition by the difference of centrifugal force on the two halves of the armature.

The reading magnets M3—M9 are formed as shown in Fig. 4, and comprise a permanent magnet M1 carrying a winding MW, arranged with its poles N, S, slightly staggered so as to bridge opposite ends of two adjacent armatures; it will be seen that if the two armatures are in the same position a small amount of flux passes, and if in opposite positions a larger amount of flux passes. Therefore, as two adjacent armatures in opposite conditions pass between the poles of a reading magnet, an impulse is produced in the magnet winding MW, due to the momentary increase in flux. Thus an impulse is produced at the instant when a point on the drum corresponding to a signal transit passes under the magnet.

Fig. 6 shows how the various magnets M1 . . . M13 are disposed around the drum DR. M1 and M2 are the armature setting magnets connected to the line relay, M3—M7 are the transit reading magnets, M8 is the start signal detector magnet (similar to M3—M7) while M9 (another reading magnet) reverses the effect of M8 after 20 milliseconds. M10, also a reading magnet, controls the printing operation.

If a prolonged stop signal is being received contact *m* and magnet M2 is energised and the armatures A are deflected to position *b*. Since all the armatures are in one position the flux in the magnets remains constant and no impulses will be produced in any of the magnets. Upon the arrival of a start signal, the tongue LRT of the line relay LR will move to the spacing, contact, whereupon magnet M1 is energised and magnet M2 de-energised. While this condition persists, armatures A passing between the poles of magnets M1 and M2 are deflected to position *a*, this position being maintained when they have emerged from between the pulse of magnets M1 and M2 by virture of that half of the armature remote from the centre of the drum having a greater centrifugal force than the other half.

After a period the first armature in this group of armatures will arrive at magnet M8, and, as already explained, a momentary increase in the flux in M8 occurs which produces an impulse in the winding of magnet M8. This impulse causes tube R6 to ionise, and tube R9 to de-ionise. The voltage drop on resistor Z therefore increases, and the potential of conductor C becomes more positive.

The amount of this change is arranged to be of such a value that any impulses generated in the windings of magnets M3—M7 are now capable of ionising tubes R1—R5. During the period in which the start signal armature was travelling from M1 and M2 to M8, subsequent armatures have been set according to the received signal combination and corresponding conditions therefore exist at points on the periphery of the drum under the magnets M3—M7. Therefore, after the armature carrying the start signal passes M8 and before it passes M9 there will be an interval of 20 milliseconds, during which the impulses are produced in the winding of magnets M3—M7 by the exit of one group of armatures from, and the entry of a group in the opposite condition into the space between the poles of these magnets. These impulses are applied to tubes R1—R5, and cause the signal transit combination to be recorded.

A second armature-setting magnet M11, M12 operated by tubes R6 and R8 is provided which causes the start signal to be re-recorded, but which obliterates all other signals. For this purpose the windings of this magnet, M11 and M12, are connected in the anode circuits of R6 and R8. This prevents any signals other than those of the start signal from ionising tubes R7 or R9.

Tube R9 is provided for the purpose of preventing any signals but the start signal from affecting tube R6. It will be seen that only one tube can be ionised at a time owing to the interconnection of the anodes of tubes R6, R8 and R9. The ionisation of one tube causes de-ionisation of either of the other two tubes. Further, the grid of R6 is connected to a potential divided PD across R8. This prevents ionisation of R6 when R8 is ionised, because under this condition conductor D is at a low potential and the impulse in M8 is insufficient to cause ionisation. Were it not for this feature, subsequent code element signals would trigger R6 after it has been restored to the stop condition, spacing elements being regenerated. Since it is desired to suppress all other signals than the start signal, the start signal itself is used to control the regenerating tubes R6 and R8 by means of a further tube R9 associated with reading magnet M13. Since R6 cannot be retriggered while R8 is ionised, R9 is provided to de-ionise R8. Magnet 13 is so positioned as to be influenced by the regenerated start signal, and thus ionise R9 and de-ionise R8, at the earliest moment when it is certain that all the transit positions on the drum of the preceding signal have passed M8.

The tube R9 is itself extinguished when R6 is triggered by the next start signal. The printing is carried out by a printing hammer PH tensioned by spring PHS and associated with printing magnet PM. The winding PM is serially connected in the anode circuit of a tube R7. Tube R7 has in its grid circuit a magnet M10 influenced by the regenerated start signal. The de-ionisation of this tube may be caused by a break contact BC in the anode circuit which is operated by the movement of the printing hammer PH.

The arrangement described has the disadvantage that, since transits in either direction of recorded signal are capable of influencing the reading magnets, and since the start signal regenerating action is initiated by one of these magnets, the start signal re-generating mechanism has to be maintained paralysed until the transit at the beginning of the stop signal has passed M8. Also, the start signal regenerating mechanism must be rendered effective before the passage of the transit at the beginning of the following start signal. Since the period between the two transits in question may be of zero duration, in 100% distorted signals, the instant when the start signal regenerating mechanism is re-rendered effective must be located with absolute precision. If this takes place too early, a late stop signal transit would operate the mechanism, whereas, if too late, a start signal would not be recorded and a character would be lost.

In a modification of the apparatus described, use is made of the fact that of the two transits in question above, one is in one direction and one in the opposite direction. The start signal detecting magnet M8 is therefore constructed so that an effective impulse is produced only when the transit is in the direction stop-to-start. A magnet which operates in this manner is shown in Fig. 5. Unlike the type of magnet shown in Fig. 4, the flux does not rise momentarily during a transit, but either increases or decreases, and remains in the increased or decreased condition throughout the next signal period. Thus, an E. M. F. in the correct direction to ionise tube R6 occurs only during transits of one kind, and the start signal regenerating mechanism may be restored to operative condition at any time between the instants at which the transit between signal elements 4 and 5, and the transit between stop and start signals, occur.

Having now particularly described and ascertained the nature of my said invention and in what manner the same is to be performed, I declare that what I claim is:

1. A receiver for start-stop printing telegraph signals comprising a continuously rotating disc, a plurality of electromagnetic armatures disposed about said disc on the periphery thereof pivoted at their mid-points and movable in planes including the axis of said disc, an armature-setting magnet having two opposed windings, a source of potential, each of said windings adapted to be alternately energized in response to received start and stop signals, said magnet positioned adjacent the periphery of said disc in operative relation with successive of said armatures, said armatures arranged to be sequentially pivoted in either of two positions by said magnet in response to received start and stop signals, a plurality of magnets, each having a winding therearound and arranged to successively cooperate with two adjacent of said armatures, said last-mentioned magnets disposed about the periphery of said disc at predetermined points spaced from said first mentioned magnet and spaced from each other, whereby said armatures induce electrical impulses in the windings of said last-mentioned magnets in accordance with the successive pivoted position of two adjacent of said armatures, and circuit means for utilizing the impulses thus produced.

2. A receiver for start-stop printing telegraph signals as claimed in claim 1, wherein said circuit means for utilizing the impulses induced in the windings of said last-mentioned magnets comprise four gas-filled discharge tubes, each having a control electrode, an anode and a cathode, the control electrodes of each of said tubes respectively connected to one terminal of respective of the windings of a corresponding number of said last-mentioned magnets, a pair of re-setting magnets, for resetting the position of said armatures, each of said re-setting magnets respectively connected between the positive terminal of said source and the respective anodes of the first and second of said tubes, an impedance serially connected between the negative terminal of said source and the cathode of the first of said tubes, an electromagnetic relay serially connected between the positive terminal of said source and the anode of the fourth of said tubes through a back contact associated with said relay, said relay adapted to actuate a printing hammer, three condensers mutually serially connected among the respective anodes of the first three of said tubes, the cathodes of the second, third and fourth of said tubes connected to the negative terminal of said source and to the other winding of said last-mentioned magnets, an impedance serially connected between the cathodes of the first and second of said tubes, a potentiometer in shunt with the anode and cathode of the second of said tubes, the cursor of said potentiometer conductively connected to the other terminal of the winding of the magnet associated with said first tube; a plurality of gas-filled discharge tubes, each having a control electrode, an anode and a cathode, the cathodes of said last-mentioned tubes connected to the negative terminal of said source, a plurality of work circuits, the respective anodes of said last-mentioned tubes serially connected to the positive terminal of said source through respective of said work circuits, the respective control electrodes of said last-mentioned tubes connected to one terminal respectively of the windings of corresponding of said last-mentioned magnets, the other terminals of such windings connected to the cathode of the first of said tubes.

FREDERICK PERCIVAL MASON.

REFERENCES CITED

The following references are of record in the file of this patent:

UNITED STATES PATENTS

| Number | Name | Date |
|---|---|---|
| 1,664,453 | Herman | Apr. 3, 1928 |

FOREIGN PATENTS

| Number | Country | Date |
|---|---|---|
| 430,685 | Great Britain | June 24, 1935 |
| 499,209 | Great Britain | Jan. 16, 1939 |